United States Patent
Ramaseshan et al.

(10) Patent No.: US 9,388,347 B2
(45) Date of Patent: Jul. 12, 2016

(54) TWO STAGE HYDROCRACKING PROCESS AND APPARATUS FOR MULTIPLE GRADE LUBE OIL BASE FEEDSTOCK PRODUCTION

(71) Applicant: Saudi Arabian Oil Company, Dhahraan (SA)

(72) Inventors: Vinod Ramaseshan, Ras Tanua (SA); Ali H. Al-Abdul'Al, Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 316 days.

(21) Appl. No.: 14/215,220

(22) Filed: Mar. 17, 2014

(65) Prior Publication Data

US 2014/0262941 A1    Sep. 18, 2014

Related U.S. Application Data

(60) Provisional application No. 61/798,576, filed on Mar. 15, 2013.

(51) Int. Cl.
| | | |
|---|---|---|
| *C10G 65/10* | (2006.01) | |
| *C10G 65/12* | (2006.01) | |
| *B01D 3/14* | (2006.01) | |
| *C10G 65/02* | (2006.01) | |

(52) U.S. Cl.
CPC ............ *C10G 65/10* (2013.01); *B01D 3/141* (2013.01); *C10G 65/12* (2013.01); *C10G 2400/10* (2013.01)

(58) Field of Classification Search
CPC ........ B01D 3/141; C10G 65/02; C10G 65/10; C10G 2400/10
See application file for complete search history.

(56) References Cited

U.S. PATENT DOCUMENTS

| | | |
|---|---|---|
| 3,870,622 A | 3/1975 | Ashton et al. |
| 4,162,962 A | 7/1979 | Stangeland |
| 4,169,040 A | 9/1979 | Bea et al. |
| 4,801,373 A | 1/1989 | Corman et al. |
| 4,954,241 A | 9/1990 | Kukes et al. |
| 5,114,562 A | 5/1992 | Haun et al. |
| 5,580,442 A | 12/1996 | Kwon et al. |
| 6,217,747 B1 | 4/2001 | Chang et al. |
| 6,261,441 B1 | 7/2001 | Gentry et al. |

(Continued)

FOREIGN PATENT DOCUMENTS

GB    1194599 A    6/1970

OTHER PUBLICATIONS

PCT/US2014/027231, International Search Report and Written Opinion dated Jun. 18, 2013, 12 pages.

(Continued)

*Primary Examiner* — Brian McCaig
(74) *Attorney, Agent, or Firm* — Abelman, Frayne & Schwab

(57) ABSTRACT

Multiple grades of lube oil base feedstock are produced within a two-stage hydrocracking unit. Effluent from a first hydrocracking zone is sent to a separation zone, which includes multiple separation vessels, and a heavy liquid stream enters one cell of a dual cell fractionator charge heater and is flashed in the distillation zone of a divided wall fractionation column. A portion of the bottom stream from one side of the divided wall column is sent to the second hydrocracking zone. Feed to a second cell of the dual cell fractionation column is derived from the effluent of this second hydrocracking zone. A different lube oil base feedstocks is derived from each of the cells of the dual cell fractionation column.

15 Claims, 1 Drawing Sheet

(56) References Cited

U.S. PATENT DOCUMENTS

| | | |
|---|---|---|
| 6,337,010 B1 | 1/2002 | Hofer |
| 6,379,532 B1 | 4/2002 | Hoehn et al. |
| 6,379,535 B1 | 4/2002 | Hoehn et al. |
| 6,517,705 B1 | 2/2003 | Kalnes et al. |
| 6,630,066 B2 | 10/2003 | Cash et al. |
| 7,005,057 B1 | 2/2006 | Kalnes et al. |
| 7,525,006 B2 | 4/2009 | Schultz et al. |
| 7,622,034 B1 | 11/2009 | Thakkar et al. |
| 8,231,778 B2 | 7/2012 | Gala |
| 2002/0189972 A1 | 12/2002 | Benazzi et al. |
| 2003/0047486 A1 | 3/2003 | Cash et al. |
| 2011/0132803 A1 | 6/2011 | Umansky et al. |
| 2011/0259793 A1 | 10/2011 | Umansky et al. |
| 2012/0004478 A1 | 1/2012 | Umansky et al. |
| 2012/0080288 A1 | 4/2012 | Petri et al. |
| 2012/0103013 A1 | 5/2012 | King et al. |
| 2012/0145594 A1 | 6/2012 | Hoehn et al. |
| 2012/0248008 A1 | 10/2012 | Dougherty et al. |
| 2012/0261307 A1 | 10/2012 | Joseck et al. |

OTHER PUBLICATIONS

Hilbert T L et al: "Consider new technology to produce 'clean diesel'", Hydrocarbon Processing, Gulf Publishing Co. Houston, US, Feb. 1, 2008, pp. 47-56, XP001525810, ISSN: 0018-8190.

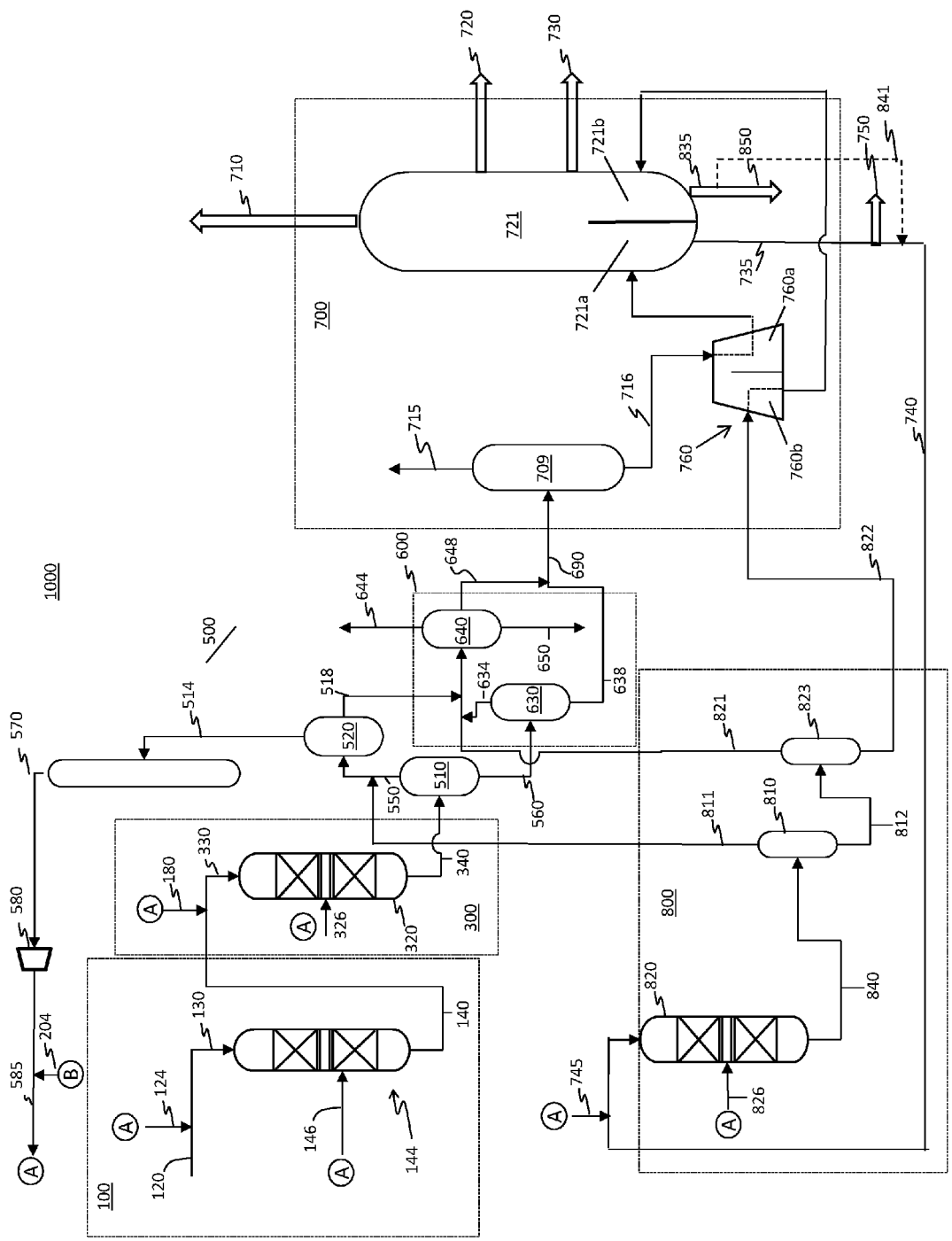

TWO STAGE HYDROCRACKING PROCESS AND APPARATUS FOR MULTIPLE GRADE LUBE OIL BASE FEEDSTOCK PRODUCTION

RELATED APPLICATIONS

The present application claims the benefit of U.S. Provisional Patent Application No. 61/798,576 filed on 15 Mar. 2013, the disclosure of which is incorporated herein by reference in its entirety.

BACKGROUND OF THE INVENTION

1. Field of the Invention

This invention relates to a two stage hydrocracking process for producing multiple grades of lube oil base feed stock.

2. Description of Related Art

Hydrocracking is typically used for conversion of relatively heavy compounds in a feedstock into lighter compounds. These processes utilize different reactor configurations including single and dual stage systems that operate in once-through or recycle schemes. Uncertain operations additional useful product recovered includes a lube oil base feedstock, whereby once-through flow schemes target a fixed conversion and viscosity index. Thus, the product lube oil base feedstock necessarily is of a single grade with the fixed viscosity index.

As demand for different grades of lube oil base feedstock increases, the ability of the hydrocracking unit to make multiple grades of lube oil base feedstock from unconverted oil produced becomes challenging. A two stage hydrocracking configuration has the ability to achieve different qualities of unconverted oil; based on the fact that both the conversion on the first stage and the conversion per pass on the second stage can be adjusted for a fixed overall conversion, and to achieve the targeted unconverted oil quality. Since the other fuel products co-produced need to meet clean fuel standards; the limitation for single stage operation can be overcome by two stages. However the fractionation system needs to be independent in order to achieve the aforesaid target. Thus traditional hydrocracking flow-schemes are limited on account of their configuration and if the flexibility is required, then atypical fractionation schemes are required. This increases complexity of the plant design and also increases both capital and operating expenditures to achieve the desired targets.

U.S. Pat. No. 6,379,535 (Hoehn) discloses a divided wall column that is used as a HPNA rejection chamber. Hoehn is not concerned with flexibility of a divided wall column as provided in the present disclosure for production of multiple grades of lube oil base feedstock within a hydrocracking unit.

US Patent Application 2011/0132083 (Umansky) discloses the combination of a single stage hydrocracking with dewaxing, where a divided wall column acts as a separator between the hydrocracked products and dewaxed products.

A need remains for an effective and economical method to produce multiple grades of lube oil base feedstock within a hydrocracking unit.

SUMMARY OF THE INVENTION

In accordance with one or more embodiments, the invention relates to processes and systems to produce multiple grades of lube oil base feedstock within a two-stage hydrocracking unit.

A feedstock, generally having a boiling point range of about 170° C. to about 700° C., is sent to a first hydrotreating zone, where the effluent of the first hydrotreating zone is sent to a first hydrocracking zone. In general the hydrotreating and hydrocracking zones can include reactors with single or multiple catalyst beds, with or without quench hydrogen between the beds. The effluent from the first hydrocracking zone is sent to a separation zone, which includes multiple separation vessels. The resulting stream enters a fractionation zone which includes an $H_2S$ stripper column, a main fractionation column and side strippers. The feed enters a stripper and the resulting bottom stream enters one cell of a dual cell fractionator charge heater and is flashed in the distillation zone of a divided wall fractionation column.

Various products, including naphtha, kerosene, diesel, are taken off at various heights within the tower and can be sent downstream for further processing. A portion of the bottom stream from one side of the divided wall column is sent to the second hydrocracking zone. The effluent of this second zone is sent to a separator and flashed in a hot low-pressure flash drum. The hot liquid stream is sent to the other cell of the dual cell fractionation feed and the second side of the divided wall column. The distillate products are recovered as typical cuts as discussed above.

This proposed flow scheme has the ability to produce multiple grade lube oil blending feedstocks (LOBFS) within the same hydrocracking unit, allowing for a reduction in overall capital expenditures, e.g., of 10% or more. The separate LOBFS are recovered from the purge streams associated with each side of the divided wall column.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in, and constitute a part of this specification. The drawings, together with the remainder of the specification, serve to explain principles and operation of the described and claimed aspects and embodiments.

BRIEF DESCRIPTION OF THE DRAWING

The foregoing summary as well as the following detailed description will be best understood when read in conjunction with the attached drawing, in which:

FIG. 1 is a process flow diagram of two stage hydrocracking process for producing multiple grades of lube oil base feedstock.

DETAILED DESCRIPTION OF THE INVENTION

For the purpose of illustrating the invention, there are shown in the drawing embodiments which are presently preferred. It should be understood, however, that the invention is not limited to the precise arrangements and apparatus shown.

A two-stage hydrocracking system 1000 comprises a hydrotreating zone 100, a first hydrocracking zone 300, a separation zone 500, a flash zone 600, a fractionation zone 700 (including a dual cell fractionator charge heater and a divided wall fractionation column), and a second hydrocracking zone 800. Distillates are recovered as typical side cuts in the column. Based upon the overall conversion in both the first and second flash stages of the hydrocracking reactors as well as the quality of the feed and the purge quantities, the exact quantity and quality of separate lube oil base feedstock streams can be optimized.

Hydrotreating reaction zone 100 includes a reactor 144 containing an effective quantity of conventional hydrotreating catalyst. Reactor 144 includes an inlet for receiving a combined stream 130 including feedstock 120 and hydrogen 124 from a hydrogen manifold "A", and an inlet for receiving quench hydrogen 146 from hydrogen manifold "A". A hydrotreated effluent 140 is discharged from reactor 144. In certain embodiments a hydrogen gas inlet stream 124 can be separate from feed stream 120 rather than being combined. Hydrotreated effluent 140 is combined with hydrogen 180 from hydrogen manifold "A" as stream 330 and charged to a first hydrocracking zone 300, including a hydrocracking reactor 320 that can have single or multiple catalyst beds and receives quench hydrogen stream between beds, as shown by stream 326 from hydrogen manifold "A".

First hydrocracking zone 300 is consequently in a sour environment (high ammonia and hydrogen sulfide). Thus, to limit the amount of catalyst required, the degree of conversion in the first hydrocracking zone 300 is limited. The first hydrocracking zone effluent stream 340 passes to separation zone 500 which includes separators 510, 520 to produce overheads 550, 514 and liquid effluent 518 and 560, which are passed to flash zone 600 including separators 630, 640 to obtain streams 638, 644, 648 and 650 as shown in FIG. 1. A hydrocarbon liquid side stream 648 from separator 640 is combined with a bottom liquid stream 638 from separator 630 to form intermediate liquid stream 690, which is passed to fractionation zone 700.

Fractionation zone 700 generally includes an $H_2S$ stripper column 709 and a divided wall fractionation column 721. Typical fractionation zones also can include one or more side strippers, stabilizers and a gas concentration zone. Intermediate liquid stream 690 enters the stripper column 709, which can be a tray or a packed column (including combinations of both). The stripper discharges a vapor stream 715 and a bottom stream 716. The vapor stream is condensed and forms part of a liquid reflux, while the remaining liquid along with the non-condensed vapor are routed for further processing in the gas concentration sections (not shown).

Bottom stream 716 is heated in one cell 760$a$ of a dual cell fractionator charge heater 760 and is passed to a first flash zone 721$a$ of the divided wall fractionation column 721. Distillate products include an overhead stream 710, a first side-stream 720, a second side-stream 730, and a first flash zone bottom stream 735. Typically, stream 710 comprises naphtha, the first side-stream 720 comprises kerosene and the second side-stream 730 comprises diesel, which each can be further stripped to meet flash and other product requirements. A portion 740 of the bottom stream 735 is charged to the second hydrocracking zone 800, with a portion 750 purged from bottoms 735 to provide one type of lube oil base feedstock. For instance, the purge quantity can be based on the amount of lower viscosity Group II lube oil base feedstock material or high viscosity heavier lube oil base feedstock material as required. The quality of the unconverted oil is a function of the conversion set in the first stage and the characteristics of the initial feed.

Stream 740 is mixed with recycle hydrogen stream 745 from hydrogen manifold "A" and is charged to second hydrocracking zone 800, which includes a hydrocracking reactor 820 having single or multiple catalyst beds and receiving quench hydrogen between the beds as shown by stream 826 from hydrogen manifold "A". Effluent from the second hydrocracking zone 840 is routed to the second hot high-pressure separator 810 and vapor stream 811 is combined with vapor stream 550. The liquid stream 812 is flashed in a hot low-pressure flash drum 823 and vapor stream 821 is combined with stream 634.

The hot liquid stream 822 is routed to the second cell 760$b$ of dual cell fractionation feed heater 760 and is then flashed in the second flash zone 721$b$ of the divided wall column. Flashed distillate streams are recovered as common side cuts as discussed above. Unconverted oil from the second stage hydrocracking zone 800 forms bottom stream 835. Stream 841 from bottom stream 835 can optionally (as indicated by dashed lines) be combined with stream 740 and recycled back to the second hydrocracking zone 800, and the remaining amount, stream 850, is purged out of the system as the second type of lube oil base feedstock. This purged amount can be characterized by a very high viscosity index and is suitable to maximize the production of high viscosity index Group III lube oil base feedstock material, e.g., 4.3 cSt. Based on the overall conversion, the conversion per pass in the second stage and the quality of feed, the exact quantity and quality of this lube oil base feedstock can be optimized.

A cold high-pressure drum 520 provides an overhead stream 514, which is rich in hydrogen and hydrogen sulfide and is then routed to an amine scrubbing system to remove the hydrogen sulfide. The sweet gas stream 570 which is rich in hydrogen can be recycled back after compression through recycle hydrogen compressor 580 to produce stream 585 that is recycled back to the hydrogen manifold "A". The high purity make-up hydrogen stream 204 from manifold "B" can be from a hydrogen plant, a pressure swing adsorption unit, a reforming unit or another suitable source.

The divided wall column is essentially a vertical division wall placed in the stripping zone of the main fractionation column. This partition can be up to about three trays above the flash zone. Beyond this point the column is similar to a typical fractionation column. The trays in either compartment of the divided wall section can be essentially be the same or can be different depending on the quality of feed entering column i.e. the conversion in the first stage and conversion per pass set in the second stage. In certain embodiments the stripping media can be a vaporized light hydrocarbon stream derived from the fractionation overhead. Conventional valve/sieve trays with single or multiple passes can commonly be practiced.

In another embodiment, when the conversion per pass in the second stage is high (e.g., >55%), or the catalyst in the second stage has a higher selectivity to lighter products, the stripper column in the fractionation zone can also be a divided wall column in order to stabilize the second stage effluent before routing to the main fractionation column. In certain embodiments the stripping media can be a vaporized light hydrocarbon stream derived from the fractionation overhead.

The initial feedstock for the present processes and embodiments includes a heavy hydrocarbon feed, which may include heavy vacuum gas oil (as a vacuum distillation unit product), heavy gas oil (as a crude distillation unit product) or de-asphalted oil (as a product from solvent de-asphalting unit). The feedstock is characterized by boiling points in the range of from 170° C. to 700° C. (338° F. to 1292° F.).

The method and system of the present invention have been described above and in the attached drawings; however, modifications will be apparent to those of ordinary skill in the art and the scope of protection for the invention is to be defined by the claims that follow.

The invention claimed is:
1. A method for producing multiple grades of lube oil feedstock comprising:

charging a feedstock and hydrogen to a first hydrocracking zone to produce a first hydrocracking zone effluent that is separated into a hydrogen recycle stream and a first intermediate product effluent;

heating at least a portion of the first intermediate product effluent in a first cell of a multiple cell fractionator charge heater;

passing the heated first intermediate product effluent to a first flash zone of a divided wall fractionation column to produce a first flash zone bottom stream;

recovering a portion of the first flash zone bottom stream as a first type of lube oil feedstock;

passing a second portion of the first flash zone bottom stream to a second hydrocracking zone to produce a second hydrocracking zone effluent that is separated into a hydrogen recycle stream and a second intermediate product effluent;

heating at least a portion of the second intermediate product effluent in a second cell of a multiple cell fractionator charge heater;

passing the heated second intermediate product effluent to a second flash zone of a divided wall fractionation column to produce a second flash zone bottom stream;

recovering a portion of the second flash zone bottom stream as a second type of lube oil feedstock; and recovering one or more distillate product streams from overhead and/or side cuts of the fractionation column.

2. The method as in claim 1, wherein the feedstock is subjected to hydrotreating, and the feedstock to the first hydrocracking zone is hydrotreated feedstock.

3. The method as in claim 1, wherein the first hydrocracking zone includes a hydrocracking reactor having a single catalyst bed.

4. The method as in claim 1, wherein the first hydrocracking zone includes a hydrocracking reactor having multiple catalyst beds.

5. The method as in claim 4, wherein a quench hydrogen stream is introduced between catalyst beds.

6. The method as in claim 1, wherein the second hydrocracking zone includes a hydrocracking reactor having a single catalyst bed.

7. The method as in claim 1, wherein the second hydrocracking zone includes a hydrocracking reactor having multiple catalyst beds.

8. The method as in claim 7, wherein a quench hydrogen stream is introduced between catalyst beds.

9. The method as in claim 1, wherein a second portion of the second flash zone bottoms stream is recycled to the second hydrocracking zone.

10. The method as in claim 1, further wherein
the first intermediate product effluent is passed through a stripper column,
discharging a vapor stream from the stripper column, and
passing a bottoms stream to the first cell of the multiple cell fractionator charge heater.

11. The method as in claim 1, wherein the divided wall fractionation column comprises a vertical division wall placed in a stripping zone of a fractionation column that extends up to three trays above the flash zone.

12. The method as in claim 1, wherein the feedstock is selected from the group consisting of heavy vacuum gas oil, heavy gas oil and de-asphalted oil.

13. The method as in claim 12, wherein the feedstock is characterized by boiling points in the range of from 170° C. to 700° C.

14. The method as in claim 13, wherein the first type of lube oil feedstock recovered from the first flash zone bottom stream comprises Group II lube oil based feedstock, and the second type of lube oil feedstock recovered from the second flash zone bottom stream comprises Group III lube oil based feedstock.

15. The method as in claim 1, further wherein
the first intermediate product effluent is passed through a high-pressure separator,
discharging a vapor stream from the high-pressure separator,
passing a liquid stream from the high-pressure separator to a low-pressure separator;
discharging a vapor stream from the low-pressure separator, and
passing a liquid stream from the low-pressure separator to the second cell of the multiple cell fractionator charge heater.

* * * * *